UNITED STATES PATENT OFFICE.

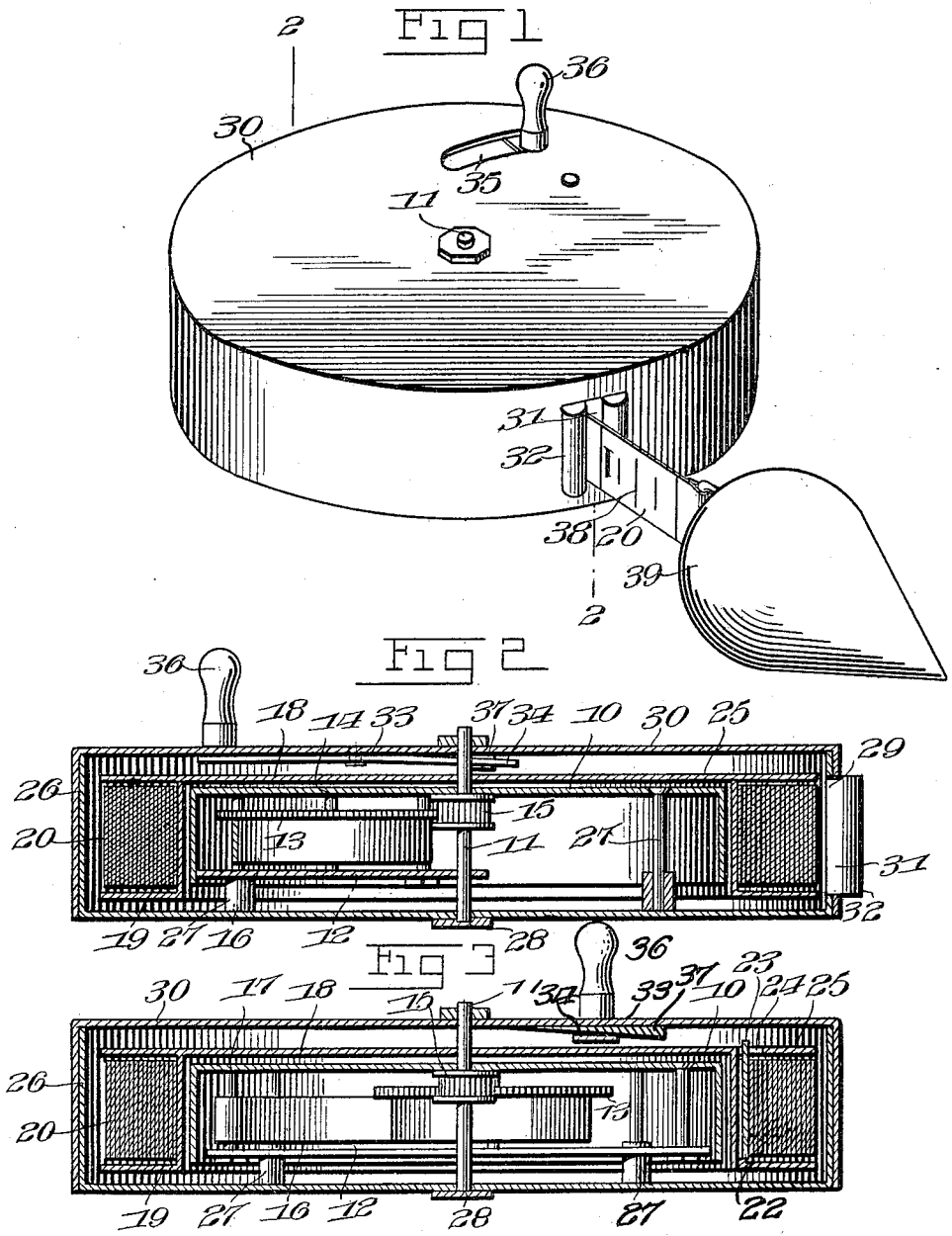

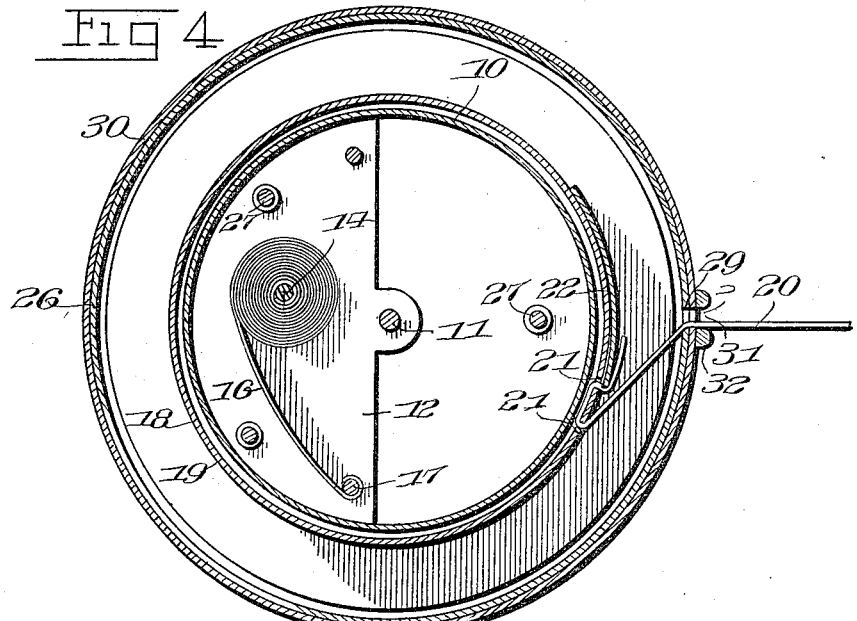
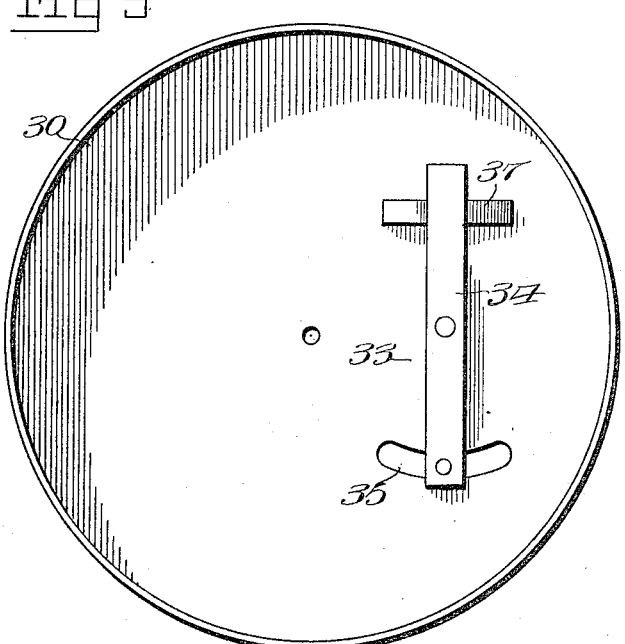

OTMER L. WEAVER, JASPER D. WEAVER, AND JAMES M. HENSLEY, OF HARTFORD, WEST VIRGINIA.

COMBINED TAPE AND PLUMB LINE.

1,069,593.

Specification of Letters Patent.   Patented Aug. 5, 1913.

Application filed July 16, 1912.   Serial No. 709,731.

*To all whom it may concern:*

Be it known that we, OTMER L. WEAVER, JASPER D. WEAVER, and JAMES M. HENSLEY, citizens of the United States, residing at Hartford, in the county of Mason and State of West Virginia, have invented new and useful Improvements in Combined Tape and Plumb Lines, of which the following is a specification.

An object of the invention is to provide a device that can be used either as a measuring tape or as a plumb line, or both.

The invention embodies, among other features, a spring-actuated mechanism for winding a tape or line upon a drum after the same has been unwound therefrom, the tape or line being either suitably graduated in feet and inches or other suitable dimensions and having a suitable plumb bob mounted on the free end thereof so that the device can be used either as a measuring tape, a plumb line or as a combined measuring tape and plumb line in instances where it is desired to not only employ a plumb bob for its usual purpose but also to simultaneously measure the distance between the plumb bob and the surface supporting the tape or line to which the plumb bob is connected.

The invention further embodies a brake member whereby, when the tape or line is unwound from the mentioned drum, the tape or line will be prevented from rewinding on the drum, it being necessary to throw the brake member into inoperative position before the spring employed to rewind the tape upon the drum can exert sufficient force to accomplish its purpose.

In the further disclosure of the invention reference is to be had to the accompanying drawings constituting a part of this specification, in which similar characters of reference denote corresponding parts in all the views, and in which:

Figure 1 is a perspective view of the device; Fig. 2 is a vertical central sectional view taken substantially on the line 2—2 in Fig. 1; Fig. 3 is a similar vertical central sectional view taken on a plane at right angles to that of Fig. 2; Fig. 4 is a horizontal sectional view; and Fig. 5 is a bottom plan view of the cover, showing the brake member thereon.

Referring more particularly to the views, it will be seen that an inner casing 10 is provided, the said casing being preferably formed of a single piece of material and having journaled thereon a shaft 11 extending at right angles thereto, a plate 12 being secured in the casing 10 and having an end of the shaft journaled therein to aid in supporting the shaft in position, a toothed wheel 13 being keyed to a shaft 14 journaled on the casing 10 and plate 12, the said toothed wheel being in mesh with a toothed wheel 15 keyed to the shaft 11, the toothed wheel 15 being of a smaller diameter than the toothed wheel 13 for a purpose that will be hereinafter more fully disclosed. A band spring 16 has the inner end thereof secured to the toothed wheel 13 and the said spring is wound around the shaft 14 adjacent the toothed wheel 13, the outer end of the said spring being rigidly secured to a pin 17 mounted within the casing 10 and having the ends thereof secured to the casing and to the plate 12 in the casing.

A drum 18 is arranged to loosely encircle and partially inclose the casing 10, an end of the shaft 11 being rigid with the said drum, and the mentioned drum having a groove 19 therein to receive a tape 20, the said drum being provided with a plurality of slots 21 Fig. 4 through which the inner end of the tape is passed, a toothed spring-like gripping member 22 being rigidly secured to the drum 18 in the groove 19 thereof and having the teeth thereof adapted to grip and bite into the inner end of the tape 20 to secure the said end of the tape rigidly on the drum, a pin 23 Fig. 3 being formed with the gripping member 22 and extending through a slot 24 in the face 25 of the drum 18 so that by exerting pressure against the pin 23 the toothed end of the gripping member 22 can be moved out of gripping engagement with the inner end of the tape, thus permitting the removal of the tape from the drum when it is desired to repair the tape or insert a new tape in lieu of the old one on the drum.

An outer casing 26 is adapted to receive the inner casing 10 and the drum 18, a series of uprights 27 being mounted to rigidly secure the inner casing 10 to the outer casing 26, the drum 18, however, being freely rotatable within the outer casing 26, as will be readily seen by referring to the views, a plate 28 being provided in the center of the face of the outer casing 26 to receive an end of the shaft 11 so that the drum 18 will be journaled on and supported within the outer casing 26 to permit of freely rotating the same therein. A slot 29 is formed in the side of the outer casing 26 and the tape 20 is adapted to pass through the said slot.

A cover 30 is provided to fit over and partially inclose the outer casing 26, the said cover being provided with a slot 31 adapted to register with the slot 29 and having the tape 20 passed therethrough, cylindrical heads 32 being preferably secured to or formed with the cover 30 adjacent the slot 31 therein in order to prevent the tape 20 from coming in direct contact with the sharp edges of the cover where the slot 31 is formed, the mentioned heads being thus provided to prevent the tape from being cut or injured by the sharp edges of the cover. An end of the shaft 11 loosely extends through an opening formed in the center of the face of the cover 30 and mounted on the inner side of the face of the cover 30 is a brake member 33, consisting of a brake rod 34 mounted to swing on the inner side of the face of the cover and having an end thereof projecting across a slot 35 formed in the cover, a handle 36 being projected loosely from the brake rod 34 to extend through the slot 35 and project exteriorly of the cover 30. Secured to the inner side of the face of the cover is a wedge like member 37 having an inclined face over which the opposite end of the brake rod 34 is adapted to pass, thus moving the mentioned end of the brake rod from the face of the cover 30 and into engagement with the face of the drum 18, the frictional engagement of the mentioned end of the brake rod 34 with the face of the drum 18 being sufficient to overcome the action of the spring 16, thus holding the drum 18 in stationary position relatively to the cover 30.

As mentioned heretofore, the tape 20 can be either in the form of a cord or can be of a ribbon-like nature as shown, and the mentioned tape is preferably provided with a series of graduations 38, the same as an ordinary measuring tape, a plumb bob 39 being connected to the free end of the said tape as shown in Fig. 1.

In the use of the device, when it is desired to employ the article either as a plumb line or a measuring tape, a pull is exerted on the plumb bob to unwind the tape 20 from the drum 18, and the rotation of the drum 18, through the medium of the toothed wheels 13 and 15, will result in a winding up of the band spring 16, within the casing 10, it being readily understood that at the moment the pull on the tape is released the action of the spring will be reversed to rewind the tape upon the drum 18, the toothed wheel 13 being preferably made larger than the toothed wheel 15 so that the rotating action of the drum 18 will be proportionately greater than the action of the spring 16, thus permitting of winding a large amount of tape upon the drum 18, with the small band spring 16, it being readily understood that it is most desirable to employ a band spring which, in its action, will take up very little room in the casing 10 to properly accomplish the result for which it is employed.

Having thus described our invention, we claim:

1. In a device of the class described, the combination with a drum, of a shaft secured to the drum and extending therethrough, an inner casing mounted within the said drum and journaled on the said shaft, a toothed wheel keyed to the shaft, a second toothed wheel journaled in the said inner casing and in mesh with the toothed wheel on the shaft, a spring secured within the inner casing and connected to the second mentioned toothed wheel, an outer casing provided with a slot and having the said drum freely revoluble therein, a tape secured to the drum and extending through the slot in the outer casing, a cover partially inclosing the said outer casing and provided with a slot adapted to register with the slot in the said outer casing, and a brake member mounted in the said cover and movable to engage a face of the said drum.

2. In a device of the class described, the combination with a drum, of a casing revolubly mounted therein, a shaft rigid with the drum and extending through the casing, with the said casing journaled thereon, a spring secured in the casing and having connection with the said shaft, an outer casing mounted to partially inclose the said drum and having a slot therein, a tape connected to the drum and extending through the slot in the outer casing, a cover for the said outer casing with the said tape passing through a slot in the cover, the said cover being provided with an opening, a brake member mounted on the inner side of the face of the cover, and a handle on the brake member and extending through the opening in the said cover, the inner end of the said brake member being adapted to engage the face of the said drum.

3. In a device of the class described, the combination with a casing provided with a slot, of a drum revolubly mounted therein, a tape on the said drum and extending through the slot in the said casing, means within the said drum for winding the said tape on to the said drum, a cover for the said casing and provided with a slot through which the said tape is passed, a brake bar mounted to swing on the inner face of the cover, a wedge like member secured to the inner face of the cover and adapted to be engaged by the said brake bar to press the brake bar inwardly from the face of the cover and into engagement with the face of the drum and means for operating the said brake bar.

4. In a device of the class described, the combination with a drum, of an inner casing mounted therein, a shaft on the said drum and having the said inner casing journaled thereon, a tape secured to the said drum, means within the inner casing and connected to the said shaft for winding the said tape on the said drum, an outer casing having rigid connection with the inner casing and having the said drum revolubly mounted therein with the tape extending through a slot in the outer casing, and a cover for connection with the said outer casing and adapted to inclose the said drum, the said cover being provided with a slot having the said tape passed therethrough.

5. In a device of the class described, the combination with a drum, of an inner casing revolubly mounted therein, a shaft on the said drum and having the said inner casing journaled thereon, a tape secured to the said drum, means within the inner casing and connected to the said shaft for winding the said tape on the said drum, an outer casing having rigid connection with the inner casing and having the said drum revolubly mounted therein with the tape extending through a slot in the outer casing, a cover for connection with the said outer casing and adapted to inclose the said drum, a brake member mounted on the said cover and movable to engage a face of the drum and means for operating the said brake member.

6. In a device of the class described, the combination with a drum provided with a plurality of slots, of a spring like gripping member secured to the said drum and having the free end thereof in gripping engagement with a tape passed through the slots of the drum.

7. In a device of the class described, the combination with a drum, of a spring-like gripping member secured to the drum, teeth on the said gripping member and having gripping engagement with a tape passed through the drum, and a pin extended from the said gripping member through a face of the drum to form a handle for releasing the said gripping member.

In testimony whereof we affix our signatures in presence of two witnesses.

OTMER L. WEAVER.
JASPER D. WEAVER.
JAMES M. HENSLEY.

Witnesses:
AUSTIN JUDSON,
A. L. CHAPMAN.

---

Copies of this patent may be obtained for five cents each, by addressing the "Commissioner of Patents, Washington, D. C."